US006187414B1

(12) United States Patent
Hasegawa et al.

(10) Patent No.: US 6,187,414 B1
(45) Date of Patent: Feb. 13, 2001

(54) FLEXIBLE LUSTERED PRODUCTS

(75) Inventors: Yukitaka Hasegawa, Inazawa; Yasuhiko Ogisu, Nagoya, both of (JP)

(73) Assignee: Toyoda Gosei Co., Ltd., Aichi-ken (JP)

( * ) Notice: Under 35 U.S.C. 154(b), the term of this patent shall be extended for 0 days.

(21) Appl. No.: 09/065,542

(22) Filed: Apr. 24, 1998

(30) Foreign Application Priority Data

Apr. 25, 1997 (JP) .................................................. 9-109518
Jul. 31, 1997 (JP) .................................................. 9-206482

(51) Int. Cl.[7] ................................ B32B 3/10; D06N 7/04

(52) U.S. Cl. ......................... 428/142; 156/598; 252/62.3; 252/73; 252/74; 428/31; 428/142; 428/148; 428/201; 428/206; 428/208; 428/209; 428/210; 428/432; 428/457; 428/411.1

(58) Field of Search ........................... 156/598; 252/62.3, 252/73, 74; 428/31, 142, 148, 201, 206, 208, 209, 210, 432, 457, 411.1

(56) References Cited

U.S. PATENT DOCUMENTS 4,369,225 1/1983 Manabe et al. .
4,402,983 * 9/1983 Craven ................................ 428/335
4,407,871 10/1983 Eisfeller .
4,431,711 2/1984 Eisfeller .
4,713,143 12/1987 Eisfeller .
4,997,702 * 3/1991 Gazit et al. .......................... 428/283
5,443,674 * 8/1995 Frezonke et al. ................. 156/331.7
5,939,228 * 8/1999 Tashiro et al. ......................... 430/49

FOREIGN PATENT DOCUMENTS

0751235 * 2/1997 (EP) ............................. C23C/14/20
9-70920 3/1997 (JP) .

* cited by examiner

*Primary Examiner*—Deborah Jones
*Assistant Examiner*—Lymaiu Miranda
(74) *Attorney, Agent, or Firm*—Intellectual Property Group Pillsbury Madison & Sutro LLP

(57) ABSTRACT

A flexible lustered product used in automobiles. The flexible lustered product includes a base material made of resin. A base coat layer is applied to at least a portion of the surface of the base material. The base coat layer has a glass transition point that is at least minus 30° C. and at most 0° C. The base coat layer includes a silane coupling agent having an epoxy group. A metal film layer is applied to at least a portion of the surface of the base coat layer. The metal film layer is anticorrosive and has a thickness that is at least 150 Å and at most 800 Å. The metal film layer is formed by a plurality of metal particles disposed in contact with one another so as to define a grain boundary between adjacent metal particles. A top coat layer is applied to at least a portion of the surface of the metal film layer. The top coat layer includes an ultraviolet ray absorbent and a silane coupling agent having an epoxy group.

16 Claims, 4 Drawing Sheets

FLEXIBLE LUSTERED PRODUCTS

BACKGROUND OF THE INVENTION

1. Field of Invention

The present invention relates to flexible lustered products used, for example, as automobile radiator grilles. More particularly, the present invention relates to flexible lustered products having a base material formed from flexible resin and a surface with metallic luster.

2. Brief Description of Related Art

As shown in FIG. 8, a typical flexible lustered product 51 includes a base material 52, which is formed from a material such as polyurethane, a base coat layer 53, which is a coating applied to the base material 52, a metal film layer 54, which is applied to the base coat layer 53, and a top coat layer 55, which is applied to the metal film layer 54. The base coat layer 53 has a mirror smooth surface to enable satisfactory application of the film layer 54. The top coat layer 55 protects the film layer 54.

The metal film layer 54 is formed from a continuous film that results in several problems. For example, the application of an external force to the lustered product 51 may result in distortion or deformation of the product 51. Among the elements constituting the lustered product 51, the base material 52, the base coat layer 53, and the top coat layer 55 restore their original form regardless of the application of the external force. However, since the film layer 54 is made of a single sheet of metal film, there is a limit to the deformation amount which the film layer 54 can tolerate. As shown in FIG. 9, when the lustered product 51 is bent by a large external force, the film layer 54 cannot follow the deformation of the base material 52 and the layers 53 and 55. Thus, a relatively large stress acts on the film layer 54. This may form cracks 56 in the film layer 54. The cracks 56 appear as white streaks and thus deteriorate the outer appearance quality of the lustered product 51.

Japanese Unexamined Patent Publication No. 9-70920 describes a metal film layer that solves the above problems. The metal film layer is made of an anticorrosive metal and has a thickness of at least 150 Å and at most 180 Å. The metal film layer also has grain boundaries.

When an external force acts on the flexible lustered product of Publication No. 9-70920, the base material, which is made of a flexible resin material, the base coat layer, and the top coat layer deform in accordance with the external force. The fine metal particles constructing the metal film layer are visually perceived as a flat metal film. However, due to the grain boundaries of the metal film layer, the application of an external force just moves adjacent crystal grains (metal grains) apart from each other and widens the distance between the crystal grains. This suppresses the formation of cracks and prevents deterioration in the quality of the outer appearance of the product. In addition, the anticorrosive property of the film layer prevents corrosion.

However, the metal film layer of the above publication is still problematic in that the adhesion of the metal film layer to the base coat layer and the top coat layer is insufficient. This is because the base coat layer and the top coat layer are made of a resin material. Therefore, when the lustered product is used under harsh conditions or over a long period of time, the base coat layer and the top coat layer may peel off the metal film layer.

SUMMARY OF THE INVENTION

Accordingly, it is an objective of the present invention to provide a flexible lustered product that prevents cracks from forming in its metal film layer, prevents deterioration of the quality of the outer appearance, and prevents peeling between its layers.

To achieve the above objective, the present invention provides a flexible lustered product including a base material made of resin. A base coat layer is applied to at least a portion of the surface of the base material. The base coat layer has a glass transition point that is at least minus 30° C. and at most 0° C. The base coat layer includes a silane coupling agent having an epoxy group. A metal film layer is applied to at least a portion of the surface of the base coat layer. The metal film layer is anticorrosive and has a thickness that is at least 150Åand at most 800 Å. The metal film layer is formed by a plurality of metal particles disposed in contact with one another so as to define a grain boundary between adjacent metal particles. A top coat layer is applied to at least a portion of the surface of the metal film layer.

The present invention provides a flexible lustered product including a base material made of resin. A base coat layer is applied to at least a portion of the surface of the base material. A metal film layer is applied to at least a portion of the surface of the base coat layer. The metal film layer is anticorrosive and has a thickness that is at least 150 Å and at most 800 Å. The metal film layer is formed by a plurality of metal particles disposed in contact with one another so as to define a grain boundary between adjacent metal particles. A top coat layer is applied to at least a portion of the surface of the metal film layer. The top coat layer includes an ultraviolet ray absorbent and a silane coupling agent having an epoxy group.

A further aspect of the present invention provides a flexible lustered product including a base material made of resin. A base coat layer is applied to at least a portion of the surface of the base material. The base coat layer has a glass transition point that is at least minus 30° C. and at most 0° C. The base coat layer includes a silane coupling agent having an epoxy group. A metal film layer is applied to at least a portion of the surface of the base coat layer. The metal film layer is anticorrosive and has a thickness that is at least 150 Å and at most 800 Å. The metal film layer is formed by a plurality of metal particles disposed in contact with one another so as to define a grain boundary between adjacent metal particles. A top coat layer is applied to at least a portion of the surface of the metal film layer. The top coat layer includes an ultraviolet ray absorbent and a silane coupling agent having an epoxy group.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of a flexible lustered product according to the present invention will now be described with reference to FIGS. 1 to 5. The lustered product is typically employed in a radiator grille of an automobile.

Figure 1:
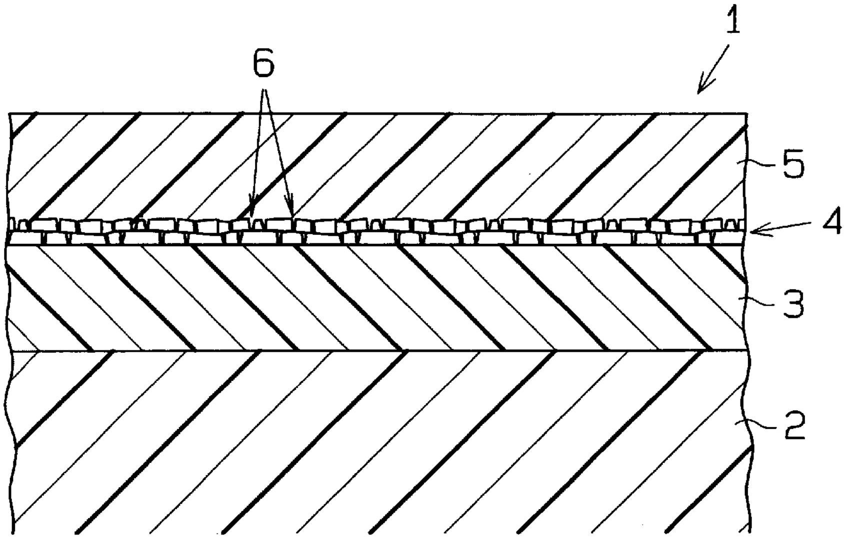
FIG. 1 is an enlarged cross-sectional view schematically showing a radiator grille according to a first embodiment of the present invention.
Figure 2:
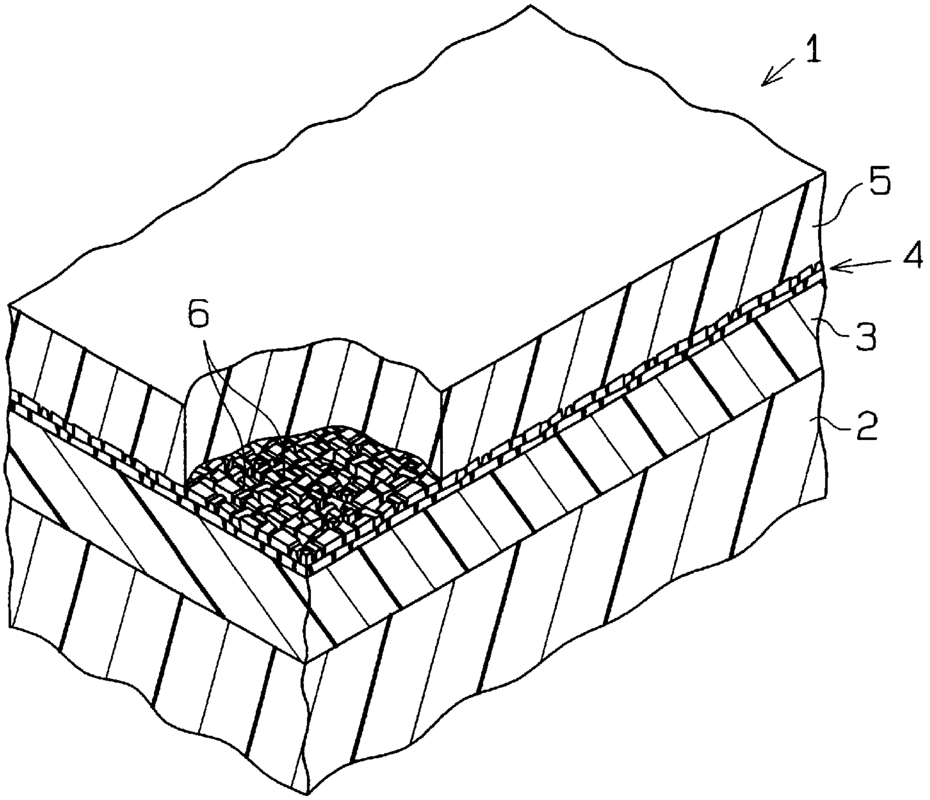
FIG. 2 is a partially cut-away perspective view schematically showing the radiator grille of FIG. 1.

As shown in FIGS. 1 and 2, a flexible lustered product, or radiator grille 1, has a base material 2, a base coat layer 3 applied to the base material 2, a metal film layer 4 applied to the base coat material 3, and a top coat layer 5 applied to the film layer 4. The base material 2 is molded, using a known molding method, from a polypropylene material admixed with a diene polymer, which includes rubber components and hydroxyl groups. Ethylene-propylene is preferably used as the rubber component. A product named FG5-1 and manufactured by Mitsubishi Kagaku Kabushiki Kaisha is preferably used as the polypropylene. The hydroxyl groups (OH groups) are used on the surface of the base material 2 as an adhesive component that enhances adhesion between the base material 2 and the base coat layer 3.

The preferable main component of the base coat layer 3 is a product named TG-B-2331, which is formed from a two liquid reaction acrylic urethane that includes a main agent and a hardening agent. The urethane coating is coating manufactured by Fujikura Kasei Kabushiki Kaisha. A one liquid lacquer coating may also be used for the base coat layer 3. The base coat layer 3 has a thickness of about 25 μm and is formed by baking the coating at 110° C. for 90 minutes. The preferable main component of the top coat layer 5 is a product named TG-T-2287, which is from a two liquid reaction acrylic urethane coating that includes a main agent and a hardening agent. The urethane coating is manufactured by Fujikura Kasei Kabushiki Kaisha. A one liquid lacquer coating may also be used for the top coat layer 5. The top coat layer 5 has a thickness of about 25 μm and is formed by baking the coating at 70° C. for 70 minutes. The metal film layer 4 has a thickness of about 400 Å and is formed from an anticorrosive material, preferably from chromium having a purity of 99.99% and manufactured by Kojyundo Kagaku Kabushiki Kaisha. The thickness of the film layer 4 may be changed arbitrarily within a range of 150 Å to 800 Å.

The film layer 4 is visually perceived as a metal film 4. However, a microscopic view of the film layer 4 reveals a composition structure formed by metal particles arranged continuously with adjacent particles in contact with each other. The boundary between each pair of adjacent metal particles defines a grain boundary 6.

The feature of the first embodiment of a flexible lustered product will be described. The base coat layer 3 has a glass transition point of minus 10° C. and is relatively soft. The base coat material 3 includes 2.5% by weight of a silane coupling agent (preferably, γ-glicidoxypropyl trimethoxysilane) and 9% by weight of an ultraviolet ray absorbent (at least either one of a benzotriazole ultraviolet ray absorbent or a benzophenone ultraviolet ray absorbent).

Figure 3:
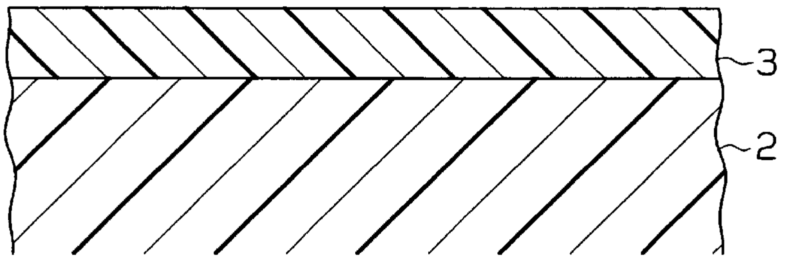
FIG. 3 is a cross-sectional view of the radiator grille taken during its production.
Figure 4:
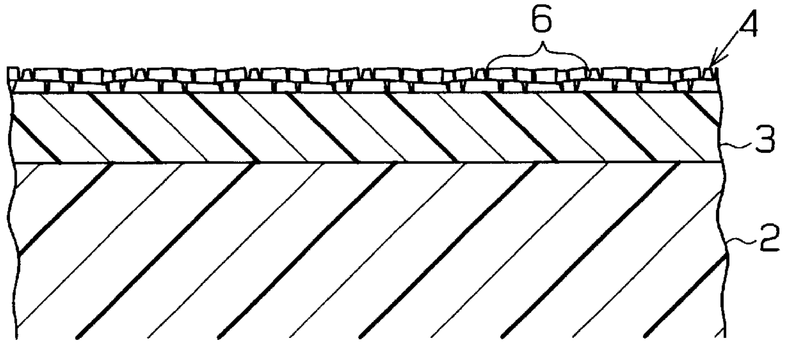
FIG. 4 is a cross-sectional view of the radiator grille taken during its production.

A method for producing the radiator grille 1 will now be described with reference to FIGS. 3 and 4. As shown in FIG. 3, the base material 2 having a shape similar to the radiator grille 1 is first molded by means of a known injection molding method. The surface of the base material 2 is degreased with isopropyl alcohol or the like and then air-dried. Afterwards, a coating is applied to the surface of the base material 2 to a thickness of about 25 μm and then baked at a high temperature of 110° C. for 90 minutes to form the base coat layer 3.

Subsequently, the base material 2, on which the base coat layer 3 is formed, is set in a known sputtering apparatus to undergo sputtering using chromium. During the sputtering, the initial vacuum degree is $6.0\times10^{-3}$ Pa, the film formation vacuum degree (argon gas pressure) is $1.0\times10^{-1}$ Pa or $5.0\times10^{-2}$ Pa. The voltage is set at 550V and the current is set at 80A during the sputtering. This forms the film layer 4 having the grain boundaries 6, as shown in FIG. 4. The average size of the crystal grains in the film layer 4 is 100 Å or smaller.

Subsequently, a coating is applied to the film layer 4 to a thickness of about 25 μm and then baked at a high temperature of 70° C. for 70 minutes to form the top coat layer 5, as shown in FIGS. 1 and 2. The product is then left to stand at room temperature for 24 hours to complete the formation of the radiator grille 1.

Figure 5:
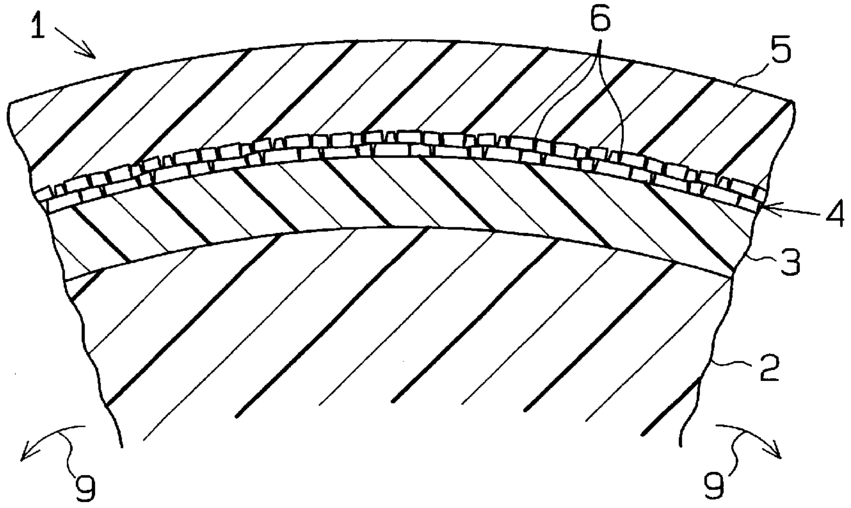
FIG. 5 is an enlarged cross-sectional view of the radiator grille when bent.

When an external force is applied to the above radiator grille 1, the flexible resin base material 2, the base coat layer 3, and the top coat layer 5 are deformed in accordance with the strength of the force, as shown in FIG. 5. Since the film layer 4 includes grain boundaries 6, the application of an external force only moves adjacent crystal grains (metal grains) apart from each other or only widens the distance between the crystal grains. Thus, stress does not negatively impact the metal particles forming the film layer 4. Accordingly, cracks are prevented from forming. This prevents deterioration in the outer appearance quality of the radiator grille 1.

The inventors of the present invention have conducted experiments to evaluate the above effects. The radiator grille 1 was bent ten times, each time by 90 degrees along a cylindrical rod having a diameter of 25mm with the top coat layer 5 faced toward the outer side. The appearance of the radiator grille 1 was then visually evaluated. The front grille 1 was confirmed to have no deficiencies during the bending experiment.

A microscopic view of the film layer 4 reveals fine metal particles. However, the film layer 4, which is an aggregation of fine metal particles, is visually perceived as a single sheet of metal film. In other words, the film layer 4 is viewed as an ordinary metal film by the naked eye. Accordingly, the radiator grille 1 has the same outer appearance quality as a film layer having a continuous metal particle structure. The film layer 4 was confirmed as shaving a visible light reflectance of 55%.

The film layer 4 is formed from chromium, which has an anticorrosive property, and is thus resistant to corrosion. Furthermore, the grain boundaries 6 of the film layer 6 results in low conductivity between adjacent crystal grains. Thus, if corrosion occurs at a portion of the film layer 4, the corrosion is prevented from spreading out. The film layer 4 has a surface resistance of 10kΩ/□.

Since the glass transition point of the base coat layer 3 is minus 10° C., the base coat layer 3 is relatively soft. Therefore, the crystal grains (metal particles) of the film layer 4 pierce and penetrate the base coat layer 3 in a relatively simple manner. This enhances the adhesion of the film layer 4 to the base coat layer 3. The glass transition point of the base coat layer 3 is high enough to obtain sufficient strength. Accordingly, the base coat layer 3 does not crack.

Furthermore, the base coat layer 3 includes a silane coupling agent (γ-glicidoxypropyltrimethoxysilane) having an epoxy group. This further enhances the adhesion between the base coat layer 3 and the film layer 4. Thus, the outer appearance quality of the radiator grille 1 is maintained and peeling between the base coat layer 3 and the film layer 4 is prevented.

The inventors of the present invention have conducted the following experiment to confirm the above effects. In the experiment, sputtering was performed on base coat layers having different glass transition points $T_g$ to form the metal film layer 4. The appearance and adhesiveness of each film layer 4 and the associated base coat layer 3 were evaluated. The adhesiveness represents how simple it is for crystal grains to penetrate the base coat layer 3. The outer appearance quality is evaluated by confirming the occurrence of cracks after performing a simple bending experiment on the base coat layer 3 and the film layer 4. The results of the evaluations are shown in Table 1. The adhesiveness was evaluated by conducting a grid adhesiveness test according to that is regulated by the Japanese Industrial Standard (JIS) D0202 4.15. This test is conducted by cutting the surface of a test piece into 100 grids. An adhesive tape is applied to the surface where the grids are formed and then quickly removed. Afterwards, the peeling of the coating, that is, the adhesive between the base coat layer 3 and the film layer 4, is evaluated. In the table, a circle indicates that peeling was not confirmed at any of 100 possible locations on the grid. A triangle indicates that peeling was confirmed at less than five locations. An "X" indicates that peeling was confirmed at five or more locations. As for the quality of the outer appearance, a circle indicates that there were no cracks and an "X" indicates that cracks were confirmed.

TABLE 1

| Glass Transition Temperature $T_g$ (° C.) | 20 | 10 | 0 | −10 | −20 | −30 | −40 |
|---|---|---|---|---|---|---|---|
| Adhesiveness Peel Test Evaluation Result | X | X | Δ | ○ | ○ | ○ | ○ |
| Outer Appearance Quality (Cracks) | ○ | ○ | ○ | ○ | ○ | ○ | X |

As apparent from Table 1, the base coat layer 3 and the film layer 4 are strongly adhered to each other when the glass transition point $T_g$ of the base coat layer 3 is 0° C. or lower due to the softness of the base coat layer 3. On the other hand, peeling occurs between the base coat layer 3 and the film layer 4 when the glass transition point $T_g$ of the base coat layer 3 is 10° C. or higher.

However, if the glass transition point $T_g$ of the base coat layer 3 is too low (minus 40° C. or lower), the strength of the base coat layer 3 becomes insufficient and results in cracks. If the glass transition point $T_g$ is within a range of minus 30° C. or higher to 0° C. or lower, the adhesion between the base coat layer 3 and the film layer 4 is relatively strong.

The effectiveness of mixing a predetermined amount of silane coupling agent (γ-glicidoxypropyltrimethoxysilane) having an epoxy group to the base coat layer 3 has also been confirmed. Base coat layers 3 containing 2.5% by weight of silane coupling agents having various types of functional groups were sputtered to form metal film layers on the base coat layers 3. The adhesiveness between each base coat layer 3 and the associated film layer 4 were evaluated by conducting the grid adhesiveness test described above. The evaluation results are shown in Table 2. In the same manner, the adhesiveness between the base coat layer 3 and the film layer 4 when mixing a silane coupling agent (γ-glicidoxypropyltrimethoxysilane) having an epoxy group to the base coat layer 3 at various content ratios has also been confirmed by conducting the grid adhesiveness test as described above. The evaluation results are shown in Table 3.

TABLE 2

| Silane Coupling Agent | Compound Name | Result |
|---|---|---|
| Containing Amino Group | γ-(2-aminoethyl)aminopropyltri-methoxysilane | X |
| Containing Vinyl Group | vinyltrimethoxysilane | X |
| Containing Chloro Group | γ-chloropropyltrimethoxysilane | X |
| Containing Epoxy Group | γ-glicidoxypropyltrimethoxysilane | ○ |

TABLE 3

| Content Ratio (% By Weight) | 0 | 0.8 | 1.5 | 2.0 | 2.5 | 3.0 |
|---|---|---|---|---|---|---|
| Adhesiveness Peel Test Evaluation Result | X | ○ | ○ | ○ | ○ | X |

As apparent from Table 2, the base coat layer 3 and the film layer 4 are strongly adhered to each other when the base coat layer 3 contains a silane coupling agent (γ-ioglicidoxypropyltrimethoxysilane) having an epoxy group. When a silane coupling agent having a functional group other than the epoxy group (i.e., amino group, vinyl group, chloro group) is mixed with the base coat layer 3, the adhesion between the base coat layer 3 and the film layer 4 are not as strong as when using a silane agent having an epoxy group.

As apparent from Table 3, when the content ratio of the silane coupling agent (γ-glicidoxypropyltrimethoxysilane) having an epoxy group is at least 0.8% by weight and at most 2.5% by weight, the base coat layer 3 and the film layer 4 are strongly adhered to each other. However, when the content ratio is not included in this range, the adhesion between the base coat layer 3 and the film layer 4 becomes weak.

The film layer 4 is formed by performing sputtering. Thus, a high level of kinetic energy is generated by the metal particles during formation of the film layer 4. This enhances the adhesion of the film layer 4 to the base coat layer 3. In addition, the relatively small size of the crystal grains in the film layer 4 permits more deformation of the film layer 4 and, thus, suppresses the formation of cracks.

The top coat layer 5 also contains a silane coupling agent (γ-glicidoxypropyltrimethoxysilane) having an epoxy group. Like the base coat layer 3, this enhances the adhesion between the top coat layer 5 and the film layer 4. Accordingly, peeling between the top coat layer 5 and the film layer 4 is suppressed.

The adhesiveness between the top coat layer 5 and the film layer 4 was also confirmed by conducting the grid adhesiveness test as described above. The content ratio of the silane coupling agent (γ-glicidoxypropyltrimethoxysilane) having an epoxy group was varied during the test. The evaluation results are shown in Table 4.

TABLE 4

| | | | | | |
|---|---|---|---|---|---|
| Content Ratio (% By Weight) | 0 | 1.2 | 2.2 | 3.2 | 4.5 |
| Adhesiveness Peel Test Evaluation Result | X | ○ | ○ | ○ | X |

As shown in Table 4, when the content ratio of the silane coupling agent (γ-glicidoxypropyltrimethoxysilane) having an epoxy group is at least 1.2% by weight and at most 3.2% by weight, the top coat layer 5 and the film layer 4 are strongly adhered to each other. When the content ratio is not included in this range, the adhesion between the top coat layer 5 and the film layer 4 becomes weak.

Additionally, the top coat layer 5 includes an ultraviolet absorbent to suppress the amount of ultraviolet rays that permeate the top coat layer 5. Therefore, the strength of adhesion between the top coat layer 5 and the film layer 4 is maintained even if the radiator grille 1 is used over a long period of time. This further suppresses peeling between the film layer and the top coat layer 5.

The top coat layer 5 contains an ultraviolet ray absorbent. This suppresses the amount of ultraviolet rays that permeate the top coat layer 5. Accordingly, the adhesion between the top coat layer 5 and the film layer 4 remains unchanged despite the usage of the radiator grille 1 over a long period of time. Thus, the ultraviolet ray absorbent further suppresses peeling between the film layer 4 and the top coat layer 5.

The inventors of the present invention have conducted experiments to confirm how the admixture of the ultraviolet ray absorbent effects the top coat layer 5. The adhesion and appearance quality of the top coat layer 5 and the film layer 4 were evaluated by varying the content ratio of the ultraviolet absorbent. The evaluations were made by conducting the grid adhesiveness test after radiating ultraviolet rays for a predetermined period of time. The evaluations results are shown in Table 5.

TABLE 5

| | | | | | |
|---|---|---|---|---|---|
| Content Ratio (% By Weight) | 0 | 3 | 6 | 9 | 12 |
| Adhesiveness Peel Test Evaluation Result | X | X | Δ | ○ | ○ |
| Outer Appearance (Color) | ○ | ○ | ○ | ○ | X |

As apparent from Table 5, the ultraviolet ray absorbent improves the weather resistance of the film layer 4 and the top coat layer 5. High adhesion is maintained between the top coat layer 5 and the film layer 4 especially when the top coat layer 5 contains 6% by weight or more of the ultraviolet ray absorbent.

If the content ratio of the ultraviolet ray absorbent is too high, that is, if the content ratio is 12% by weight or more, the adhesion between the top coat layer 5 and the film layer 4 is maintained but the top coat layer 5 yellows and thus affects the quality of the outer appearance.

Accordingly, it is preferable that the content ratio of the ultraviolet ray absorbent be 6% by weight or more and lower than 12% by weight.

A second embodiment according to the present invention will now be described. To avoid a redundant description, like or same numerals are given to those components which are the same as the corresponding components of the first embodiment.

Figure 6:
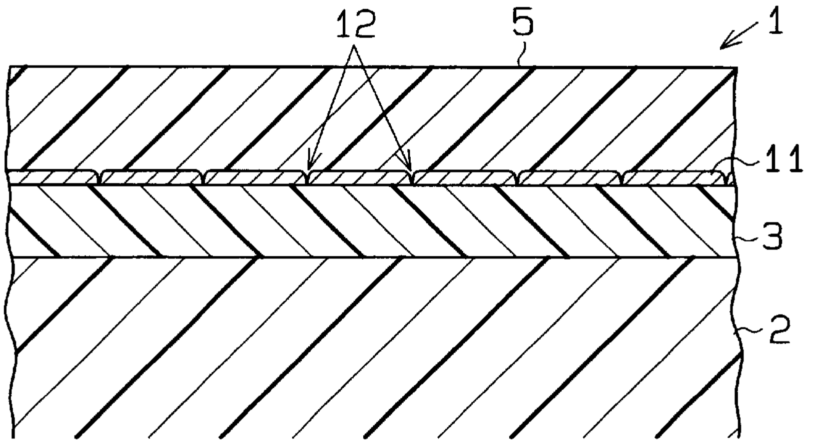
FIG. 6 is an enlarged cross-sectional view schematically showing a radiator grille according to a second embodiment of the present invention.
Figure 7:
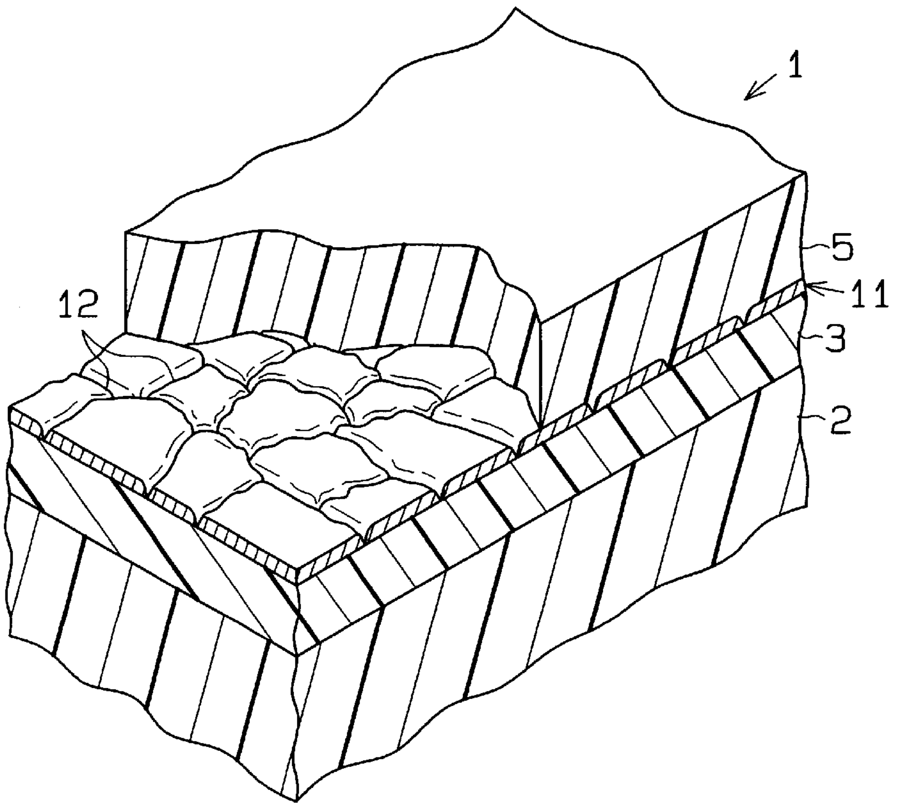
FIG. 7 is a partially cut-away perspective view schematically showing the radiator grille of FIG. 6.
Figure 8:
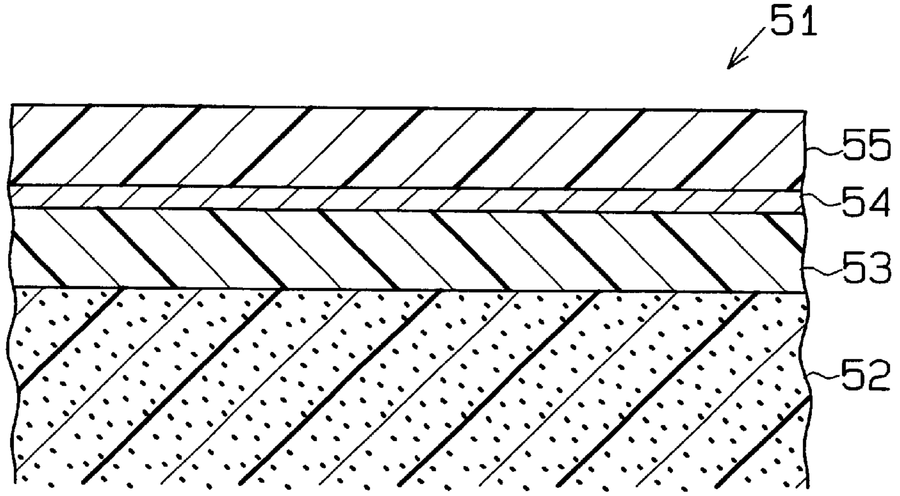
Fig.8 (PRIOR ART)
FIG. 8 is a cross-sectional view schematically showing the structure of a prior art flexible lustered product.
Figure 9:
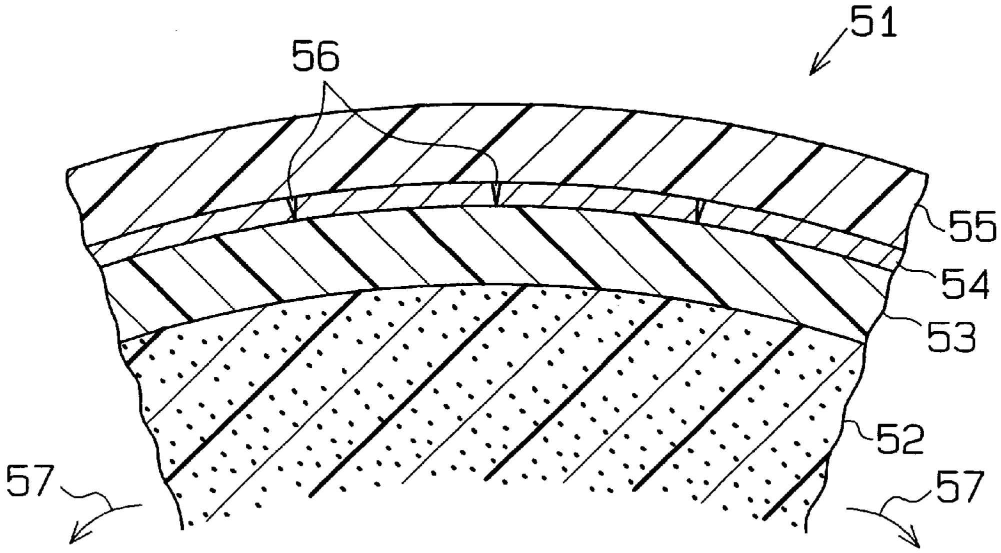
Fig.9 (PRIOR ART)
FIG. 9 is a cross-sectional view showing the deficiency of the prior art flexible lustered product.

As shown in FIGS. 6 and 7, the method for forming a metal film layer 11 differs from that of the first embodiment. Like the first embodiment, the film layer 11 is formed from chromium, has a thickness of about 400 Å, and is visually perceived as a metal film. However, a microscopic view of the film layer 4 reveals a composition structure formed by continuously arranged metal particles with adjacent particles contacting one another. The boundary between each pair of adjacent metal particles defines a grain boundary 12.

The front grille 1 is preferably manufactured in the following manner. The base material 2 and the base coat layer 3 are formed in the same manner as the first embodiment. The base coat layer 3 has a thickness of about 15 μm and is baked for 60 minutes under a high temperature of 80° C. The baking completes the formation of the base coat layer 3.

The base material 2 having the base coat layer 3 is then set in a known vacuum evaporator. Chromium vapor deposition is started when the initial vacuum degree reaches $2.0\times10^{-3}$ Pa. The rate of vacuum vapor deposition is preferably 1.0 Å/sec. This forms the film layer 11, which has grain boundaries 12, on the base coat layer 3. The average size of the crystal grains in the metal film layer 11 is 200 Å.

A urethane coating is then applied to the film layer 11 to form the top coat layer 5. The top coat layer 5 has a thickness of about 25 μm and is baked for 60 minutes under a high temperature of 80° C. The baking completes the formation of the top coat layer 5 on the film layer 11. The product is then left to stand at room temperature for 24 hours to complete the formation of the radiator grille 1. The film layer 11 has a surface resistance of 250kΩ/□.

The same advantages as the first embodiment are obtained from the radiator grille 1 of the second embodiment.

A third embodiment according to the present invention will now be described.

In this embodiment, a radical trap agent is contained in the top coat layer 5 to suppress peeling between the top coat layer 5 and the film layer 4 during long usage of the resin product.

The radial trap agent includes a light stabilizer and an antioxidant. Hindered amine light stabilizer (HALS) is used preferably as the light stabilizer. A methyl HALS such as Sanol LS-765 manufactured by Sankyo Kabushiki Kaisha and Adeka Stab LA-62 manufactured by Asahi Denka Kogyo Kabushiki Kaisha are especially preferred as the light stabilizer. A phenol antioxidant such as Adeka Stab A0–20 manufactured by Asahi Denka Kogyo Kabushiki Kaisha is used preferably as the antioxidant. The radical trap agent in the top coat layer 5 is required to have a content ratio of at least 0.5% by weight and at most 2.5% by weight. If the content ratio is less than 0.5% by weight, peeling may occur between the film layer 4 and the top coat layer 5. Peeling may also occur between the film layer 4 and the top coat layer 5 if the content ratio exceeds 2.5% by weight. It is considered that this is because when a large amount of the radical trap agent including the HALS is contained in the top coat layer 5, the radical trap agent reacts with the OH groups of the main substance in the top coat layer 5.

The inventors of the present invention have conducted an experiment to evaluate peeling between the top coat layer 5, which contains the radical trap agent, and the film layer 4. Test pieces were produced in the same manner as the first embodiment unless otherwise described. The content ratio of the radical trap agent (the ratio of the light stabilizer to the antioxidant being 3:2 based on weight) in the top coat layer 5 was varied. Each test piece was evaluated by conducting a weather resistant test using a super UV tester. The adhesion of the top coat layer 5 to the film layer 4 was then evaluated by conducting a grid adhesiveness test. The evaluation results are shown in Table 6.

The grid adhesiveness test was conducted by defining 16 grids on each test piece. Peeling was attempted five times in each grid. In the table, x/16 indicates the number of grids that were peeled among the 16 grids. In sample No. 1, the top coat layer 5 did not include a radical trap agent. In sample No. 2, the base material 2 was annealed for 60 minutes under a high temperature of 110° C. In sample No. 3, the amount of silane coupling agent was doubled to 5.0% by weight. In sample No. 4, the silane coupling agent in the base coat layer 3 was replaced by β-3,4-epoxycyclohexylethyltrimethoxysilane. In sample Nos. 5 to 9, the content ratio of the radical trap agent was varied between the range of 0.5% by weight to 3.0% by weight. In sample No. 10, the content ratio of the ultraviolet ray absorbent in the top coat layer 5 was increased to 12% by weight. In sample No. 11, an ultraviolet ray absorbent that absorbs ultraviolet rays having wavelengths in the vicinity 360 nm was mixed in the top coat layer 5 to a content ratio of 12% by weight.

TABLE 6

| No. | Radical Trap Agent Content Ratio (% By Weight) | Note | Number of Super UV Processing Cycles 15 | 20 | 25 | 30 | 35 | 40 |
|---|---|---|---|---|---|---|---|---|
| 1 | 0 | | 0/16 ○ | 1/16 Δ | 3/16 X | | | |
| 2 | 1.5 | Base Material Annealed | 0/16 ○ | 0/16 ○ | 0/16 ○ | 0/16 ○ | 3/16 X | |
| 3 | 1.5 | Silane Coupling Agent In Base Coat Layer Doubled | 0/16 ○ | 0/16 ○ | 0/16 ○ | 0/16 ○ | 7/16 X | |
| 4 | 1.5 | Silane Coupling Agent In Base Coat Layer Changed | 0/16 ○ | 0/16 ○ | 0/16 ○ | 0/16 ○ | 5/16 X | |
| 5 | 0.5 | | 0/16 ○ | 0/16 ○ | 0/16 ○ | 1/16 Δ | | |
| 6 | 1.0 | | 0/16 ○ | 0/16 ○ | 0/16 ○ | 0/16 ○ | 7/16 X | |
| 7 | 1.5 | | 0/16 ○ | 0/16 ○ | 0/16 ○ | 0/16 ○ | 5/16 X | |
| 8 | 2.5 | | 0/16 ○ | 0/16 ○ | 0/16 ○ | 1/16 Δ | | |
| 9 | 3.0 | | 0/16 ○ | 1/16 Δ | | | | |
| 10 | 1.5 | UVA Amount Increased (12% By Weight) | 0/16 ○ | 0/16 ○ | 0/16 ○ | 0/16 ○ | 0/16 ○ | 2/16 Δ |

TABLE 6-continued

| No. | Radical Trap Agent Content Ratio (% By Weight) | Note | Number of Super UV Processing Cycles 15 | 20 | 25 | 30 | 35 | 40 |
|---|---|---|---|---|---|---|---|---|
| 11 | 1.5 | UVA Amount Increased (12% By Weight) | 0/16 ○ | 0/16 ○ | 0/16 ○ | 0/16 ○ | 4/16 X | |

As apparent from Table 6, peeling was confirmed for the test piece that did not contain the radical trap agent (sample No. 1) when conducting 20 cycles of the super UV processing. However, peeling was not confirmed when the content ratio of the radical trap agent was at least 0.5% by eight and at most 2.5% by weight (sample Nos. 2–8) even after conducting 25 cycles of the super UV processing. Furthermore, peeling was confirmed for the test piece having a radical trap agent content ratio of 3.0% by weight (sample No. 9) when conducting the super UV processing for 20 cycles.

Additionally, peeling was not confirmed for a higher number of super UV processing cycles when the amount of the ultraviolet ray absorbent was increased. Thus, an increase in the amount of ultraviolet ray absorbent suppresses peeling.

Since the top coat layer 5 contains a radial trap agent including a light stabilizer and an antioxidant, deterioration and oxidation of the top coat layer 5 caused by light is suppressed regardless of the radiator grille 1 (flexible lustered product) being exposed to the atmosphere over a long period of time. Therefore, peeling between the top coat layer 4 and the metal film layer 5 is suppressed regardless of the radiator grille 1 being used over a long period of time.

It should be apparent to those skilled in the art that the present invention may be embodied in many other specific forms without departing from the spirit or scope of the invention.

In the above embodiments, the metal film layers 4 and 11 may be formed from an anticorrosive metal material other than chromium such as nickel, titanium, tantalum, aluminum, or an alloy of these metals.

The grain boundaries 6 and 12 of the associated film layers 4 and 11, respectively, were formed by performing sputtering or vacuum deposition in the above embodiments. However, other methods such as ion plating may be performed instead to form grain boundaries.

In the above embodiments, the flexible lustered products are applied to automobile radiator grilles 1. However, the flexible lustered products may also be applied to other components used in the interior or exterior of automobiles or other vehicles such as emblems or mouldings.

The color of the lustered product elements including the base material 2 were not specified above. However, the elements may be colored.

Therefore, the present examples and embodiments are to be considered as illustrative and not restrictive and the invention is not to be limited to the details given herein, but may be modified within the scope and equivalence of the appended claims.

What is claimed is:

1. A flexible lustered product comprising:

a base material made of resin;

a base coat layer applied to at least a portion of a surface of the base material, wherein the base coat layer has a glass transition point that is at least minus 30° C. and at most 0° C., wherein the base coat layer includes a silane coupling agent having an epoxy group, and wherein the silane coupling agent in the base coat layer has a content ratio of at least 0.8% and at most 2.5% by weight;

a metal film layer applied to at least a portion of a surface of the base coat layer, wherein the metal film layer is anticorrosive and has a thickness that is at least 150 Å and at most 800 Å, and wherein the metal film layer is formed by a plurality of metal particles disposed in contact with one another so as to define a grain boundary between adjacent metal particles; and a top coat layer applied to at least a portion of a surface of the metal film layer.

2. The flexible lustered product of claim 1, wherein the silane coupling agent in the base coat layer is γ-glicidoxypropyltrimethoxysilane.

3. The flexible lustered product of claim 1, wherein the base material is made of polypropylene.

4. A flexible lustered product comprising:

a base material made of resin;

a base coat layer applied to at least a portion of a surface of the base material;

a metal film layer applied to at least a portion of a surface of the base coat layer, wherein the metal film layer is anticorrosive and has a thickness that is at least 150 Å and at most 800 Å, and wherein the metal film layer is formed by plurality of metal particles disposed in contact with one another to define a grain boundary between adjacent metal particles; and a top coat layer applied to at least a portion of a surface of the metal film layer, wherein the top coat layer includes an ultraviolet ray absorbent and a silane coupling agent having an epoxy group, wherein the silane coupling agent in the top coat layer has a content ratio of at least 1.2% and at most 3.2% by weight.

5. The flexible lustered product of claim 4, wherein the silane coupling agent in the top coat layer is γ-glicidoxypropyltrimethoxysilane.

6. The flexible lustered product of claim 4, wherein the top coat layer further comprises a radical trap agent containing a light stabilizer and an antioxidant.

7. The flexible lustered product of claim 6, wherein the light stabilizer is a hindered amine light stabilizer.

8. The flexible lustered product of claim 6, wherein the radical trap agent in the top coat layer has a content ratio of at least 0.5% by weight and at most 2.5% by weight.

9. The flexible lustered product of claim 4, wherein the base material is made of polypropylene.

10. A flexible lustered product comprising:

a base material made of resin;

a base coat layer applied to at least a portion of a surface of the base material, wherein the base coat layer has a glass transition point that is at least minus 30° C. and at most 0° C., wherein the base coat layer includes a silane coupling agent having an epoxy group, and wherein the silane coupling agent in the base coat layer has a content ratio of at least 0.8% and at most 2.5% by weight;

a metal film layer applied to at least a portion of a surface of the base coat layer, wherein the metal film layer is anticorrosive and has a thickness that is at least 150 Å and at most 800 Å, and wherein the metal film layer is formed by a plurality of metal particles disposed in contact with one another to define a grain boundary between adjacent metal particles; and a top coat layer applied to at least a portion of a surface of the metal film layer, wherein the top coat layer comprises an ultraviolet ray absorbent and a silane coupling agent having an epoxy group, wherein the silane coupling agent in the top coat layer has a content ratio of at least 1.2% and at most 3.2% by weight.

11. The flexible lustered product of claim 10, wherein the silane coupling agent in the base coat layer is γ-glicidoxypropyltrimethoxysilane.

12. The flexible lustered product of claim 10, wherein the silane coupling agent in the top coat layer is γ-glicidoxypropyltrimethoxysilane.

13. The flexible lustered product of claim 10, wherein the top coat layer further comprises a radical trap agent containing a light stabilizer and an antioxidant.

14. The flexible lustered product of claim 13, wherein the light stabilizer is a hindered amine light stabilizer.

15. The flexible lustered product of claim 13, wherein the radical trap agent in the top coat layer has a content ratio of at least 0.5% by weight and at most 2.5% by weight.

16. The flexible lustered product of claim 10, wherein the base material is made of polypropylene.

* * * * *